(12) United States Patent
Steelhammer et al.

(10) Patent No.: US 6,416,574 B1
(45) Date of Patent: Jul. 9, 2002

(54) METHOD AND APPARATUS FOR RECYCLING CEMENT KILN DUST

(75) Inventors: Joe C. Steelhammer, West Point; Clayton W. Hackett, Columbus, both of MS (US); Milton O. Sundbeck, Jr., Baytown, TX (US); John E. Coleman, West Point, MS (US)

(73) Assignee: Southern Ionica Incorporated, West Point, MI (US)

( * ) Notice: Subject to any disclaimer, the term of this patent is extended or adjusted under 35 U.S.C. 154(b) by 0 days.

(21) Appl. No.: 09/722,753

(22) Filed: Nov. 27, 2000

Related U.S. Application Data
(60) Provisional application No. 60/217,545, filed on Jul. 12, 2000.

(51) Int. Cl.⁷ ............................................. C04B 18/08
(52) U.S. Cl. ..................................... 106/751; 106/745
(58) Field of Search .............................. 106/716, 739, 106/745, 751

(56) References Cited

U.S. PATENT DOCUMENTS

| | | |
|---|---|---|
| 2,140,471 A | 12/1938 | Frolich et al. |
| 2,211,368 A | 8/1940 | Dickens |
| 2,264,336 A | 12/1941 | Scripture, Jr. |
| 2,329,940 A | 9/1943 | Ponzer |
| 2,477,262 A | 7/1949 | Mooser |
| 2,687,290 A | 8/1954 | Garoutte et al. |
| 2,819,171 A | 1/1958 | Scripture, Jr. et al. |
| 2,871,133 A * | 1/1959 | Palonen |
| 3,206,526 A | 9/1965 | Rygaard |
| 3,298,843 A | 1/1967 | Asano |
| 3,765,920 A | 10/1973 | Humphrey |
| 3,772,045 A | 11/1973 | Haldas et al. |
| 3,867,163 A | 2/1975 | Uchikawa et al. |
| 4,031,184 A | 6/1977 | McCord |
| 4,049,462 A | 9/1977 | Cocozza |
| 4,161,411 A | 7/1979 | Sell et al. |
| 4,175,975 A | 11/1979 | MacWilliams et al. |
| 4,227,931 A | 10/1980 | Uchikawa et al. |
| 4,464,200 A | 8/1984 | Duval |
| 4,584,022 A | 4/1986 | Cohen |
| 4,654,085 A | 3/1987 | Schinski |
| 4,842,649 A | 6/1989 | Heitzmann et al. |
| 4,971,627 A | 11/1990 | Koslowski et al. |
| 5,154,771 A | 10/1992 | Wada et al. |
| 5,156,676 A | 10/1992 | Garrett et al. |
| 5,494,515 A | 2/1996 | Young |
| 5,743,934 A | 4/1998 | Wommack et al. |
| 5,782,973 A | 7/1998 | Cohen et al. |
| 5,916,122 A | 6/1999 | McClure et al. |
| 5,922,124 A | 7/1999 | Supplee |
| 5,997,599 A | 12/1999 | Wommack et al. |
| 6,027,561 A | 2/2000 | Gruber et al. |
| 6,109,913 A * | 8/2000 | Young .......................... 432/16 |

FOREIGN PATENT DOCUMENTS

| | | |
|---|---|---|
| GB | 595587 | * 12/1947 |
| GB | 783129 | 9/1957 |

* cited by examiner

*Primary Examiner*—Paul Marcantoni
(74) *Attorney, Agent, or Firm*—Kilyk & Bowersox, P.L.L.C.

(57) ABSTRACT

Methods for recycling cement kiln dust are described and involve heating a mixture containing at least one additive, water, and cement kiln dust for a sufficient time and at sufficient temperatures to form cement clinker. The additive contains an organic polyacid, a hydroxy carboxylic acid, a polycarboxylic acid, a saccharide, a carbohydrate, a salt thereof, or combinations thereof. A cement slurry containing water, cement kiln dust, and the above-described additive is also described as well as apparatus for recycling the cement kiln dust.

33 Claims, 1 Drawing Sheet

METHOD AND APPARATUS FOR RECYCLING CEMENT KILN DUST

This application claims the benefit under 35 U.S.C. §119(e) of prior U.S. Provisional Patent Application No. 60/217,545 filed Jul. 12, 2000, which is incorporated in its entirety by reference herein.

BACKGROUND OF THE INVENTION

The present invention relates to cement products and in particular relates to the recovery and recycling of cement kiln dust. The present invention further relates to the recovered cement kiln dust and its use in cement products.

As stated in U.S. Pat. Nos. 5,156,676 and 4,584,022 (both incorporated in their entirety by reference herein), the calcining and clinkering of cement ingredients can be accomplished by a number of ways. The typical process uses a rotary kiln, either wet or dry. The cement ingredients, i.e., the cement raw materials, are finely ground and intimately mixed to provide a substantially homogenous mixture. This homogenous mixture is added to the input or feed-end of the kiln and is commonly referred to as the raw kiln feed. The kiln is tipped downwardly at an angle such that the heat-end of the kiln is below the feed-end. The kiln has generally four operating zones including a precalcining zone, a calcining zone, a clinkering zone, and a cooling zone. Conventional fuel is combined with preheated air and injected into the kiln at the heat-end. Fuels such as natural gas, oil, or pulverized coal are conventionally used in cement manufacturing.

As the finely divided cement raw materials pass into the rotating kiln at the feed-end, the kiln feed is heated from near ambient temperature to about 1000° F. in the precalcining zone. In this zone, the heat of the combustion gases from the calcining zone is used to raise the temperature of the raw materials. Additionally, in the kiln, chain systems or the like may be attached to the interior of the kiln and are employed to improve the efficiency of heat exchange between the gases and raw materials.

The temperature of the raw materials is increased from about 1000° F. to about 2000° F. as they pass through the calcining zone. This calcined material then passes into the clinkering or burning zone where the temperature is raised to about 2700° F. It is in this zone that the primary raw materials are converted into the typical cement compounds. The cement clinkers then leave the clinkering zone where the clinkers are cooled and processed further such as by grinding.

Exhaust gases from the rotary kiln exit and the feed-end of the kiln entrain fine particles of the cement raw materials being supplied to the kiln. These fine particles are collected in high efficiency dust collectors such as fabric filters or electrostatic precipitators. These collected particles are referred to as cement kiln dust (CKD) or dust catch.

As mentioned earlier, the process may involve either a wet or dry rotary kiln. When a wet rotary kiln is used, the raw kiln feed is a slurry of the cement raw materials and water. Any water introduced into the kiln will increase fuel costs. Since volatilization of the water requires energy, the percent solids of the kiln feed slurry is kept to a maximum, using only enough to achieve a kiln feed slurry that can be pumped into the kiln at a reasonable cost. In some cases, it may be cost effective to use a specific type of chemical additive that can reduce the viscosity of the kiln feed slurry. Such an additive is commonly called a slurry thinner or dispersant and can minimize the water required while still maintaining a slurry viscosity that can be pumped cost effectively.

The cement kiln dust (CKD) that escapes from the kiln is not suitable for use in cement and so is generally disposed of in a landfill. Since CKD can represent as much as 15% by weight of the cement clinker actually produced, there are considerable economic benefits that can be gained if the CKD can somehow be reused in the cement making process. One means of doing this is to feed the CKD dust into the kiln at the heat-end of the kiln, a method commonly referred to as insulfflation. However, this process in the best case can only reuse about 50% of the CKD generated.

Accordingly, there is a need in the industry to develop methods and apparatus to more efficiently recover and use the cement kiln dust generated by cement manufacturing plants and to incorporate this cement kiln dust into finished cement clinker.

SUMMARY OF THE PRESENT INVENTION

A feature of the present invention is to provide a method and apparatus for recycling cement kiln dust.

Another feature of the present invention is to provide products made from the recycled kiln dust.

Additional features of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages, and in accordance with the purposes of the present invention, as embodied and broadly described herein, the present invention relates to a method for recycling cement kiln dust. The method involves heating a mixture containing at least one additive, water, and cement kiln dust for a sufficient time and at sufficient temperatures to form cement clinker. The additive contains at least an organic polyacid, a hydroxy carboxylic acid, a polycarboxylic acid, a saccharide, a carbohydrate, a salt thereof, or combinations thereof.

The present invention further relates to a method for recycling cement kiln dust involving the recovery of cement kiln dust, the blending of the cement kiln dust with water and at least one additive to form a slurry and then feeding the slurry into a kiln. The slurry is then heated for a sufficient time and at sufficient temperatures to form cement clinker. The additive is the same additive as described above.

The present invention also relates to a cement slurry comprising water, cement kiln dust, and at least one additive selected from an organic polyacid, a hydroxy carboxylic acid, a polycarboxylic acid, a saccharide, a carbohydrate, a salt thereof, or combinations thereof.

Furthermore, the present invention relates to a system for recycling cement kiln dust which includes a cement dust kiln dust collector in communication with means to transfer the kiln dust from the cement dust kiln dust collector to a pre-mixer. The pre-mixer also receives a water feed line and an additive feed line wherein the pre-mixer mixes together the cement kiln dust, the water, and additive together to form a slurry. In communication with the pre-mixer is a final mixer, such as a stirred tank-type mixer which is equipped with baffles and a mixing impeller. Connected to the final mixer is a slurry delivery pump which conveys the cement kiln dust slurry directly back to a kiln feed to be introduced into a cement kiln. The cement kiln dust recycling system can further include a variety of additional equipment and instruments such as flow meters, metering pumps, rotary valves, dilution systems, and other related equipment.

It is to be understood that both the foregoing general description and the following detailed description are exemplary and explanatory only and are intended to provide a further explanation of the present invention, as claimed.

The accompanying drawings, which are incorporated in and constitute a part of this application, illustrate embodiments of the present invention and together with the description, serve to explain the principles of the present invention.

DETAILED DESCRIPTION OF THE PRESENT INVENTION

Figure 1:
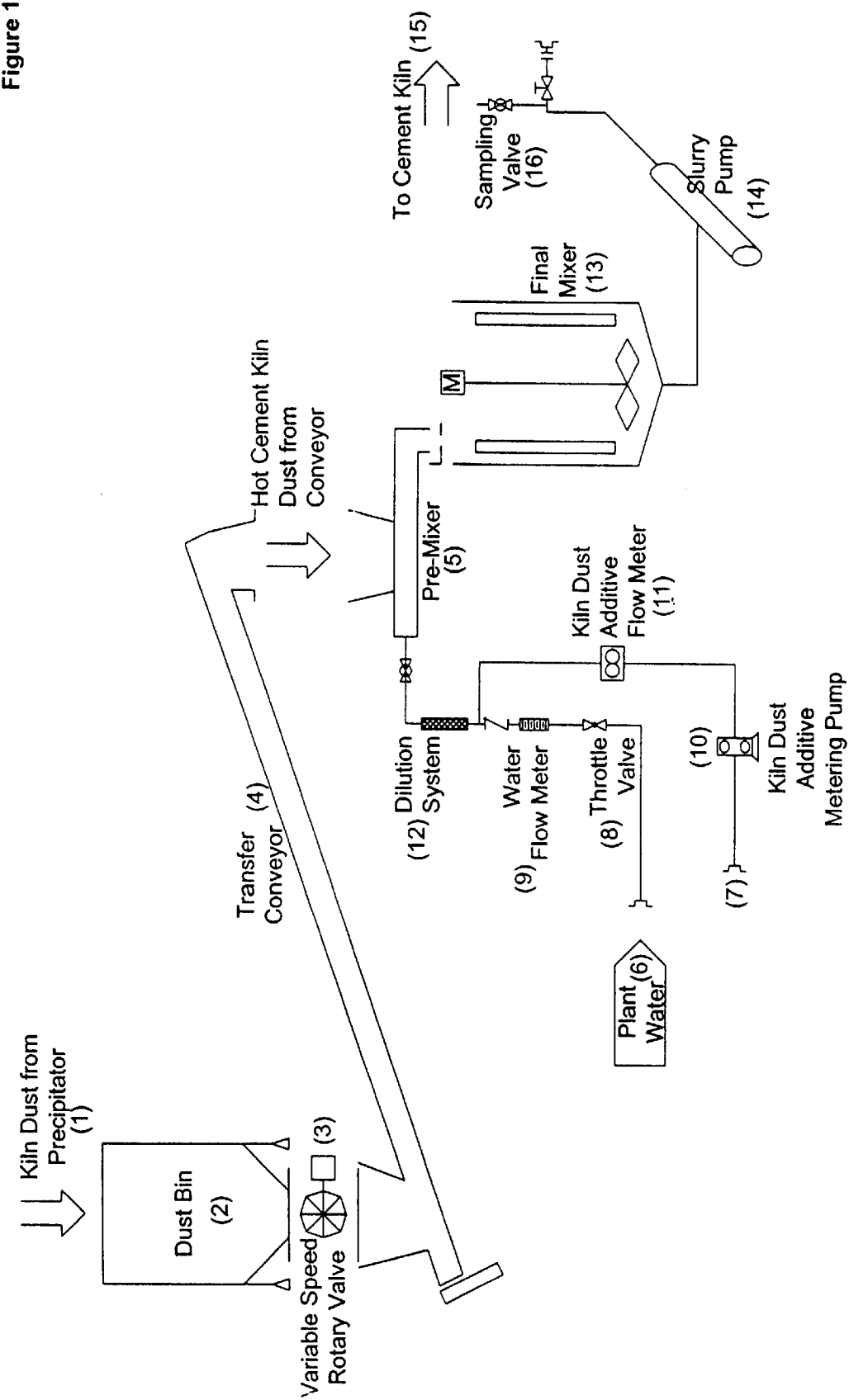
FIG. 1 is a flow diagram representing one embodiment of the cement dust recycling system of the present invention.

The present invention relates to methods for recycling cement kiln dust and further relates to cement products made from recycled cement kiln dust.

In a method of the present invention, at least one additive, cement kiln dust, and water are mixed together to form a mixture. This mixture is then heated preferably after being blended with cement raw materials, for a sufficient time and at sufficient temperatures to form cement clinker. The cement clinker can then be used or further processed in the same manner as any other cement clinker formed by a cement manufacturing plant. Further, and as described below, the cement slurry contains water, cement kiln dust, and at least one additive comprising an organic polyacid, a hydroxy carboxylic acid, a polycarboxylic acid, a saccharide, a carbohydrate, a salt thereof, or combinations thereof.

The additive that is present in the mixture preferably provides an acceptable pumping viscosity at the lowest water content possible along with providing a sufficient set-time for the mixture containing the cement kiln dust to permit the dust to be re-utilized. Additives which are acceptable for purposes of the present invention include, but are not limited to, an organic polyacid, a hydroxy carboxylic acid, a polycarboxylic acid, a saccharide, a carbohydrate, a salt thereof, or combinations thereof.

Examples of suitable additives include, but are not limited to, compounds having the general formula: $R^1$—(—$CR^3OH$—)$_x$—$R^2$, wherein $R^1$ and/or $R^2$ represent —$CH_2OH$ or —$COOH$, or a salt thereof, wherein $R^1$ and $R^2$ can be the same or different. x is greater than 0 and more preferably is an integer of from 2 to 10. $R^3$ represents either —H or —COOH or a salt thereof. Specific examples of these types of compounds include, but are not limited to, gluconic acid, sodium gluconate, tartaric acid, sodium tartrate, glucoheptonic acid, sodium glucoheptonate, sorbitol, mannitol, and the like.

Another class of additives that can be used in the present invention include polymeric carboxylic acids and salts thereof which preferably have a molecular weight range from about 750 to about 250,000. Examples of these types of polymeric carboxylic acids include, but are not limited to, polyacrylic acid, polymethacrylic acid, co-polymers thereof, and/or salts thereof.

Another class of additives that can be used are saccharides and carbohydrates such as monosaccharide, polysaccharides, and derivatives thereof. Specific examples include, but are not limited to, sugars such as glucose, sucrose, mannose, fructose, and the like, as well as cellulose.

Mixtures of various additives can be used in any combination. For instance, a combination of sodium gluconate and gluconic acid or a combination of sodium glucoheptonate and gluconic acid can be used.

The additives that are used in the mixture can be present in any concentration, but are preferably present in a concentration of from about 0.05% to about 5% by weight of the dry cement kiln dust, and more preferably from about 0.1% to about 1%. Any amount of additive can be present in the mixture containing the water and cement kiln dust so long as the recycling of the cement kiln dust is possible. Preferably, the amount of additive present in the mixture is from about 1 pound or less to about 100 pounds or more per dry ton of cement kiln dust. More preferably, the amount of additive present is from about 2 pounds to about 50 pounds per dry ton of cement kiln, and most preferably is from about 5 pounds to about 30 pounds of additive per dry ton of cement kiln dust.

The cement kiln dust that is mixed with the water and at least one additive can be the dust, also known as dust catch, that results from the manufacturing or processing of cement raw materials into cement clinker. Typically, the cement kiln dust is the result of fine particles collected as a result of exhaust gases from a kiln exit and/or feed-end of the kiln entraining fine particles of the cement raw materials being supplied to the kiln. These fine particles can be collected in high efficiency dust collectors such as fabric filters or electrostatic precipitators or other devices capable of collecting fine particles. Typically, the cement kiln dust will have a particle size of from about 0.5 microns to about 500 microns and may comprise cement raw materials, such as calcium carbonate containing material, silica containing material, alumina containing material, iron containing material, and the like. More specific examples are limestone, clay, and sand. The cement kiln dust may also comprise calcined material or cement clinker. The cement kiln dust may also comprise material that has been exposed to the calcining zone, the clinkering zone, and/or the cooling zone of the kiln.

The water that is mixed with the cement kiln dust and at least one additive is present in any amount in order to permit the recycling of the cement kiln dust. Preferably, the lowest amount of water possible is preferred. As an example, the amount of water present in the mixture containing the cement kiln dust, water, and at least one additive is such that the water content of the mixture is about 45% or less by weight, more preferably from about 20% to about 45% by weight, and most preferably from about 30% to about 45% by weight. While water is preferred, other aqueous solutions can be used or the water can be mixed with other water-soluble solutions such as alcohols and the like. The amount of cement kiln dust to water is generally at a weight ratio from about 60 to 40 to about 75 to 25.

Other conventional ingredients can be present, such as, but not limited to, antifoams, defoamers, surfactants, neutralizing agents (acids or bases), friction reducing agents, and the like.

With respect to the heating of the mixture, such heating can occur in a kiln, furnace, or other similar device. Preferably, the heating of the mixture occurs in a kiln, and more preferably in a rotary kiln. Generally, any device which is used in the formation of cement clinker from cement raw materials can be used for purposes of the present invention.

The heating of the mixture can occur in the same manner as the formation of cement clinker from cement raw materials. Those conditions are known to those skilled in the art and can be applied to the present invention. For example, the heating of the mixture to form the cement clinker can be subjected to a calcining step and then a clinkering step. In more detail, the calcining step will calcine the cement kiln dust alone or with other cement raw materials (which generally are not cement kiln dust) to form a calcined material. Typically, in such a calcining step, the temperature of calcination is from about 1000° F. to about 2000° F. After the calcining step, the material then enters a clinkering zone wherein the calcined material is heated at sintering temperatures typically ranging from about 2300° F. to about 2900° F. Typically in such a heating operation, there will be a pre-calcining zone which heats the material to just below the temperature needed to form calcined material and a cooling zone to reduce the temperature of the cement clinker once formed. Thus, the kiln used will have plurality of treatment zones which include at least a calcination zone and a clinkering zone but can include other zones.

As indicated earlier, the mixture that is heated can be combined with cement raw materials which are not cement kiln dust. This is preferred for purposes of the present invention. Typically, the amount of cement kiln dust mixed with cement raw materials which are not cement kiln dust is at a weight percent of dry materials of from about 1% to about 50%, more preferably from about 5% to about 30%, and most preferably from about 10% to about 20%. The mixing of the cement kiln dust that is present in the mixture along with the cement raw materials can occur prior to being introduced into the kiln or two feed lines can be introduced into the same kiln wherein one feed line contains the mixture containing the cement kiln dust and the other feed line contains cement raw materials. Alternatively, the cement kiln dust present in the mixture of the present invention can be used by itself to form cement clinker which can then optionally be combined with other cement clinker. Any combination is possible.

Generally, once the additive and water are present with the cement kiln dust, the set-time of the mixture or slurry is at least 12 hours, more preferably is at least 24 hours, and most preferably is at least 48 hours or more. Furthermore, the relative viscosity of the mixture is preferably from about 1 to about 15, more preferably from about 1 to about 10, and most preferably from about 1 to about 5. The relative viscosity for purposes of the present invention is the direct reading obtained from a Brookfield viscometer, Model RVT using a T-C bar from the Helipath spindle set at one RPM.

Once the cement clinker is formed from the cement kiln dust, typically, this finished cement clinker will preferably have low volatile amounts, low alkali amounts and/or low sulfur amounts.

The cement clinker formed will typically contain tricalcium silicates, dicalcium silicates, tricalcium aluminates, tetracalcium-alumina ferrates, combinations thereof and the like.

Thus, the present invention preferably involves a method for recycling cement kiln dust which includes recovering the cement kiln dust and then blending the cement kiln dust with water and at least one additive as described above to form a slurry. The slurry is then fed into a kiln wherein the slurry is heated for a sufficient time and at sufficient temperatures to form cement clinker.

The method can be operated using many options. For instance, water and the at least one additive can be pre-mixed prior to being mixed together with the cement kiln dust or, alternatively, the cement kiln dust, water, and the at least one additive can be mixed all at the same time. Any order of addition can be used.

Any equipment can be used to provide the above-described mixing of the various ingredients and delivery of these ingredients into a kiln. Preferably, a cement kiln dust recycle system as described below is preferred and is one embodiment of the present invention.

In particular, cement kiln dust that has been collected or recovered from a cement manufacturing process can be collected in a collector or dust bin. The cement kiln dust is then transferred by transfer means such as a conveyor belt or other delivery system to a pre-mixer wherein the transfer means is in communication with the dust bin and the transfer means is in communication with the pre-mixer. The pre-mixer is preferably an intensive pre-mixer which preferably has a two shaft pug mill. The intermixing paddles in the pre-mixer preferably rapidly and thoroughly disperse the cement kiln dust with the water and additive(s) to form the slurry. Other types of continuous intensive mixers can also be used such as Cowles dissolvers, pin mixers, high-speed dispersers (e.g., in-line agitated pipeline mixers), homogenizer mills, and the like. The mixtures are run at a sufficient RPM to form a homogeneous mixture of the ingredients. The transfer means, which is preferably a conveying device, can be an incline screw conveyor. The cement kiln dust collected, for instance in a dust bin, can be metered onto the transferring means using any type of dispensing device such as a variable speed rotary valve or other suitable device.

The water and additive can be introduced by feed lines into the pre-mixer. The additive and water can be introduced into the mixture using two separate feed lines or the additive and water can be pre-combined and then introduced as one feed then introduced into the pre-mixer. Conventional metering pumps and flow meters can be used to achieve the proper dilution of the additive with the water prior to introduction into the pre-mixer. Since the preferred additive is a water-based product, the additive rapidly disperses and mixes with the water. As indicated, the flow control of the water and at least one additive can be easily accomplished by flow control valves and rotometers or precision variable speed metering pumps and flow indicating meters.

The pre-mixer is connected to or in communication with a final mixer which can also serve as a slurry tank. Preferably, this final mixer is a stirred tank type mixer which is equipped with baffles and a heavy duty mixing impeller. The final mixer-slurry tank preferably ensures that small lumps formed by the pre-mixer are completely dispersed into the bulk agitated slurry before being pumped to the cement kiln and further ensures that the slurry tank provides an inventory of slurry. The final mixer also can provide a release point for the steam vapor generated in the dust-water mixing operation. From the final mixer, the slurry can be pumped by a slurry pump into the kiln. For instance, the slurry delivery pump can be such that it is capable of flows of about 100 gallons per minute or less and a head requirement of 100 to about 150 feet with the pump preferably being a positive displacement type pump. More preferably, the pump is a peristaltic type positive displacement pump or a progressive cavity type positive displacement pump. The slurry flow rate to the kiln can be measured by any conventional measuring device, such as a magnetic-type flow tube.

The flow rates of the cement kiln dust, water, and the additive can be controlled by pre-calculated blend charts based on the above-described ratios of the three ingredients or can be controlled by a computer which controls the feed rates based on the above-described ratios of ingredients. Each of these ways can easily be set up by one having ordinary skill in the art in view of the present application. Further, a loss-in-weight control, for instance, can be used to regulate the speed of the rotary valve feeding the cement kiln dust onto the transfer means. The cement kiln dust recycling system of the present invention can be modified in many ways to accommodate various distributing systems known to those skilled in the art in view of other chemical manufacturing operations. Feed lines for the water and additive preferably are connected to holding tanks which contain the additive and water.

In the process of the present invention, the operation can be continuous or can be a batch system depending upon the needs of the manufacturing plant. FIG. 1 is an exemplary embodiment of the cement dust recycle system. In particular, the cement kiln dust is recovered from a collecting device such as a precipitator (1) which is collected into a dust bin (2) which is then metered onto a transfer conveyor belt (4) by means of a metering device such as a variable speed rotary valve under the influence of a loss-in-weight controller (3). The cement kiln dust transported by the conveyor is then introduced into a pre-mixer (5) wherein water (6) and the at least one additive (7) are fed into the pre-mixer (5) by way of a throttle valve (8) and a water flow meter (9) as well as a metering pump (10) and a flow meter (11) wherein the additive and water are pre-combined by way of a dilution system (12) located before the pre-mixer (5). The mixture is then introduced into a final mixer (13) wherein, through feed lines and proper piping, the final mixture can be introduced into the cement kiln by a slurry pump (14) which pumps the mixture to the cement kiln. A sampling valve (15) can be located before the cement kiln for purposes of checking the quality of the mixture.

The present invention will be further clarified by the following examples, which are intended to be purely exemplary of the present invention.

EXAMPLES

Various compounds were examined to determine their effectiveness or lack of dispersing effectiveness for purposes of recycling cement kiln dust. The cement kiln dust slurry used for testing purposes was a 65% by weight dry cement kiln dust combined with 35% by weight water which provided a relative viscosity measurement of 100 as determined by a viscometer set-up which used a Brookfield Model RVT viscometer mounted on a Helipath stand with a T-C bar spindle at one RPM. In making this measurement, samples required sufficient volume to allow the Helipath to move one inch up and down through the slurry and typically a 100-gram sample in a 250 ml beaker was sufficient. In making the viscosity measurement, the cement slurry sample was inserted beneath the T-C spindle and the relative viscosity was recorded as soon as possible within one revolution. The relative viscosity is the direct reading from the Brookfield viscometer.

Table 1 sets forth a variety of compounds that were tested for purposes of the present invention. As can be seen, certain compounds reduced the viscosity of the cement kiln dust water mixture. Simple acids such as acetic acid and sulfuric acid were not effective in reducing viscosity, but the other acids set forth in Table 1 were effective.

The present invention was then tested at a cement plant (following the set-up in FIG. 1) to determine if cement kiln dust could be recycled. In particular, the trial was run for 174 hours with an average rate of dust recycled to the kiln of 10.85 tons per hour with an average of 14.5 pounds of a blend of sodium gluconate and gluconic acid (totaling 60% solids) used per ton of cement kiln dust. As a result, the total amount of cement kiln dust recycled was 1888.4 tons. The trial was considered a success.

Another trial was run for a total of 184 hours wherein the average rate of dust recycled to the kiln was 11.7 tons per hour with 2052 tons of cement kiln recycled. The amount of sodium gluconate and gluconic acid that were added ranged from 10 pounds to about 20 pounds per ton of cement kiln dust. The moisture content of the slurry was about 40%. The volatiles, alkali, and sulfur content of the finished cement clinker remained within acceptable ranges.

For both trials, the treated cement kiln dust slurry was added to the kiln near the point of the raw mill feed. The treated CKD slurry to raw mill feed weight ratio was about 15:85. It was not necessary to add additional cement raw materials to the treated CKD slurry.

During the experiment, the amount of cement kiln dust was processed and the feed rate of the additive were varied from 6 tons of cement kiln dust per hour or less with 20 pounds of additive per ton of cement kiln dust to 14 tons of cement kiln dust per hour with 12 pounds of additive per ton of cement kiln dust.

TABLE 1

CKD at 35% Moisture-Relative Viscosity Values Lbs/Ton Dry CKD

| Compound | 0 | 1.85 | 3.7 | 5.5 | 7.4 | 11.1 | 14.8 | 18.5 |
|---|---|---|---|---|---|---|---|---|
| Gluconic Acid (50%) | 17 | 5.5 | 4 | 4 | 3 | 2.5 | — | — |
| Acetic Acid (25%) | 15.5 | — | 15 | — | 13 | 13 | 13 | — |
| Tartaric Acid (20%) | 15 | — | 12 | — | 9.5 | 8 | 7 | 7 |
| Sulfuric Acid (10%) | 15 | — | 14 | — | 14 | 14 | 14 | 14 |
| Citric Acid (50%) | 16 | 8 | 6 | 4.5 | 3 | — | — | — |
| Polycarboxylates | 0 | 09.2 | 1.84 | 2.8 | 3.7 | 5.5 | | 7.4 |
| Accumer 1020 | 16.5 | 8 | 5.5 | 4 | 3.5 | 2.5 | | 1.5 |
| Tamol 850 | — | — | — | — | — | — | | — |
| Antiprex 461 | 17 | 11.5 | 9 | 6.5 | 4.5 | — | | — |
| Colloid 142 | 15 | 12.5 | 9 | 6.5 | 5 | — | | — |
| Colloid 211 | 16 | 11 | 8 | 6 | 5 | — | | — |

Accumer™ and Tamol™ are polycarboxylates available from Rohm & Haas, Philadelphia, Pa. Colloid 142 and 211 are polycarboxylates available from Vinings Industries, Inc., Marietta, Ga. Antiprex 461 is a polycarboxylate available from Allied Colloids (Ciba Specialties), Suffolk, Va.

Thus, the ability of the methods of the present invention to recycle kiln dust was shown.

Other embodiments of the present invention will be apparent to those skilled in the art from consideration of the present specification and practice of the present invention disclosed herein. It is intended that the present specification and examples be considered as exemplary only with a true scope and spirit of the present invention being indicated by the following claims and equivalents thereof.

What is claimed is:

1. A method for recycling cement kiln dust comprising heating a mixture comprising at least one additive, water, and cement kiln dust for a sufficient time and at sufficient temperatures to form cement clinker, wherein said additive comprises an organic polyacid, a hydroxy or polyhydroxy carboxylic acid, a polycarboxylic acid, a saccharide, a carbohydrate, a salt thereof, or combinations thereof.

2. A method for recycling cement kiln dust comprising:
  recovering cement kiln dust;
  blending said cement kiln dust with water and at least one additive to form a slurry;

feeding said slurry into a kiln;

heating said slurry for a sufficient time and at sufficient temperatures to form cement clinker, wherein said additive comprises an organic polyacid, a hydroxy carboxylic acid, a polycarboxylic acid, a saccharide, a carbohydrate, a salt thereof, or combinations thereof.

3. A cement slurry comprising water, cement kiln dust, and at least one additive comprising an organic polyacid, a hydroxy carboxylic acid, a polycarboxylic acid, a saccharide, a carbohydrate, a salt thereof, or combinations thereof.

4. The method of claim 1, further comprising combining said mixture with cement raw material prior to said heating or at the time of said heating.

5. The method of claim 1, further comprising combining said cement clinker with a second cement clinker which is formed from at least one cement raw material, wherein said second cement clinker is added after formation of the said cement clinker from said cement kiln dust.

6. The method of claim 5, wherein said cement clinker and said second cement clinker are combined at a weight percent of from about 7% to about 20%.

7. The method of claim 1, wherein said mixture has a water content of from about 30 to about 45% by weight of the mixture.

8. The method of claim 1, wherein said at least one additive is present in said mixture in an amount of from about 5 pounds to about 30 pounds per dry ton of cement kiln dust.

9. The method of claim 1, wherein said at least one additive is gluconic acid, tartaric acid, citric acid, polyacrylic acid, polymethacrylic acid, or salts thereof or combinations thereof.

10. The method of claim 1, wherein said mixture has a set time of a minimum of 48 hours.

11. The method of claim 1, wherein said mixture has a relative viscosity of 15 or less, as measured by the direct reading from a Brookfiled viscometer, Model RVT using the T-C bar from the Helipath spindle set at 1 rpm.

12. The method of claim 1, wherein the ratio of water to cement kiln dust is from about 3:7 to about 4:6.

13. The method of claim 1, wherein said at least one additive is a blend of a) sodium gluconate and b) gluconic acid or sodium glucoheptonate.

14. The method of claim 1, wherein said cement clinker has a low alkali content, a low sulfur content, and a low volatile amount.

15. The method of claim 1, wherein said heating occurs in a kiln.

16. The method of claim 1, wherein said heating occurs in a rotary kiln.

17. The method of claim 1, wherein said heating comprises a calcining zone and a clinkering zone.

18. The method of claim 1, wherein said heating comprises a precalcining zone, a calcining zone, a clinkering zone, and a cooling zone.

19. The method of claim 1, wherein said heating involves a calcining zone wherein said mixture is heated to a temperature sufficient to calcine said cement kiln dust present in said mixture to form calcined material and then heating said calcined material in a clinkering zone at sintering temperatures sufficient to form said cement clinker.

20. The method of claim 19, wherein said sintering temperature ranges from about 2300° F. to about 2900° F. and said calcining temperature ranges from about 1000° F. to about 2000° F.

21. The cement clinker formed by the method of claim 1.

22. The method of claim 1, wherein said additive comprises the general formula: $R^1$—(—$CR^3OH$—)$_x$—$R^2$, wherein $R^1$ and $R^2$ are the same or different and represent —$CH_2OH$ or —COOH, or a salt thereof; x is an integer greater than 0; and $R^3$ represents —H or —COOH, or a salt thereof.

23. The method of claim 1, wherein said additive is a polymeric carboxylic acid having a molecular weight range of from about 750 to about 250,000, or a salt thereof.

24. The method of claim 1, wherein said additive is a polyacrylic acid, a polymethacrylic acid, a copolymer thereof, or a salt thereof.

25. The method of claim 1, wherein said additive is a monosaccharide, a polysaccharide, or a combination thereof.

26. The method of claim 1, wherein said additive is a sugar.

27. The method of claim 1, wherein said additive is glucose, sucrose, mannose, fructose, cellulose, or combinations thereof.

28. The cement slurry of claim 3, wherein said additive comprises the general formula: $R^1$—(—$CR^3OH$—)$_x$—$R^2$, wherein $R^1$ and $R^2$ are the same or different and represent —$CH_2OH$ or —COOH, or a salt thereof; x is an integer greater than 0; and $R^3$ represents —H or —COOH, or a salt thereof.

29. The cement slurry of claim 3, wherein said additive is a polymeric carboxylic acid having a molecular weight range of from about 750 to about 250,000, or a salt thereof.

30. The cement slurry of claim 3, wherein said additive is a polyacrylic acid, a polymethacrylic acid, a copolymer thereof, or a salt thereof.

31. The cement slurry of claim 3, wherein said additive is a monosaccharide, a polysaccharide, or a combination thereof.

32. The cement slurry of claim 3, wherein said additive is a sugar.

33. The cement slurry of claim 3, wherein said additive is glucose, sucrose, mannose, fructose, cellulose, or combinations thereof.

* * * * *

UNITED STATES PATENT AND TRADEMARK OFFICE
CERTIFICATE OF CORRECTION

PATENT NO.   : 6,416,574 B1
DATED        : July 9, 2002
INVENTOR(S)  : Steelhammer et al.

It is certified that error appears in the above-identified patent and that said Letters Patent is hereby corrected as shown below:

Ttile page,
Item [73], "Southern Ionica", should read -- Southern Ionics --.

Signed and Sealed this

Third Day of December, 2002

JAMES E. ROGAN
*Director of the United States Patent and Trademark Office*